Patented June 23, 1931

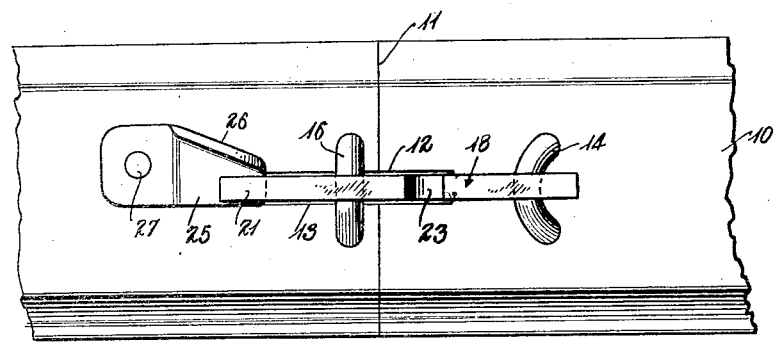
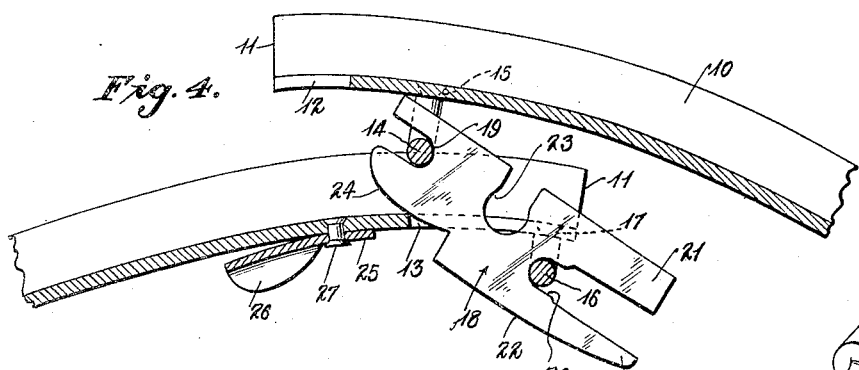
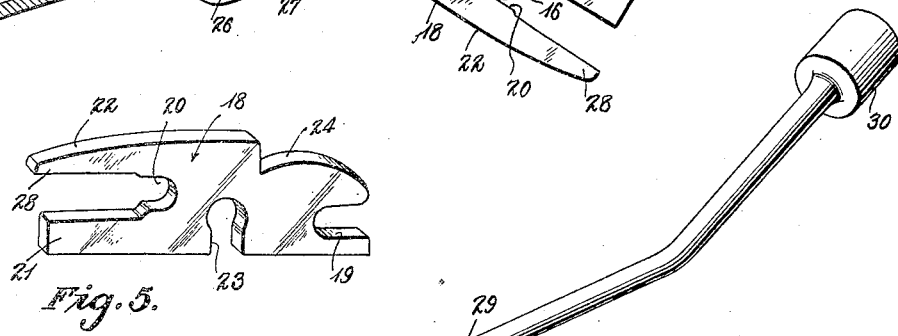
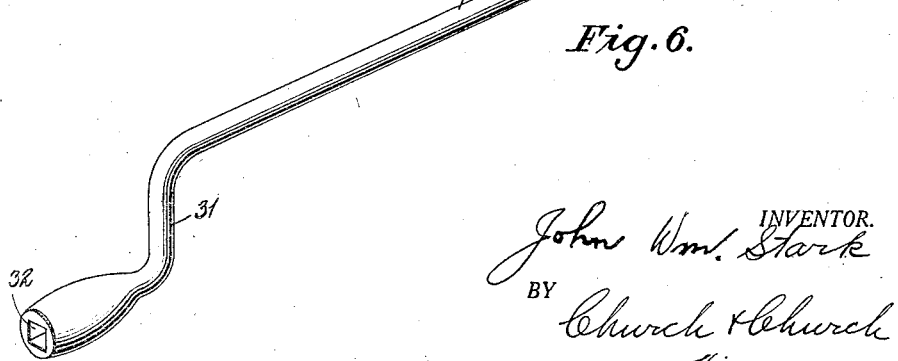

1,811,337

UNITED STATES PATENT OFFICE

JOHN WILLIAM STARK, OF BOWLING GREEN, KENTUCKY

DEMOUNTABLE RIM

Application filed July 5, 1928. Serial No. 290,558.

My invention relates to demountable rims and has to do, more particularly, with demountable rims of the transplit type and the means for expanding and contracting such rims.

With the advent of balloon tires, the demountable rims used on automobile wheels have become of smaller diameter and greater width with the result that they are stiffer than they used to be. As a result of this, it has become more of a problem to collapse such transplit rims in order to remove the tires therefrom. The principal object of my invention is to provide a simple and relatively cheap construction for connecting the ends of a transplit rim which shall form an efficient rim-operating means for expanding and contracting the transplit rim with ease. A further object of my invention is to provide a transplit demountable rim having a device for expanding and contracting the rim, which is made of a few parts and which can be manufactured at a low cost. Another object of my invention is to provide a rim-operating lever which is quickly detachable from the rim and can be inserted in operative position very quickly and easily, so as to facilitate assembly and reduce the cost of manufacture of the rim and rim-expanding and contracting means.

Further objects, and objects relating to details and economies of operation and construction, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this application, in which:

Fig. 3 is a bottom plan view of said rim portion and the rim-expanding and contracting means;

Fig. 4 is a fragmentary, sectional view through the rim, at the split, showing the rim contracted;

Fig. 5 is a view, in perspective, of the rim-operating lever detached; and

Fig. 6 is a perspective view of the operating tool used to turn the rim-operating lever about its pivot.

In the drawings, the same reference numerals refer to the same parts throughout the several views.

In general, I accomplish the objects of my invention by providing a transplit demountable rim with a pair of shackle members which are fixed to the rim on opposite sides of the split and extend inwardly therefrom. Cooperating with these shackle members, I provide a rim-operating lever, one end of which pivots on one of the shackle members while the other end engages the other shackle member. The operating lever may be provided with a projecting tongue, which is adapted to receive an operating tool for rocking the lever about its pivot. The lever may also have a projecting outer edge portion, which fits in alined slots in the opposite ends of the rim base, so as to maintain the lateral alinement of the opposite ends of the rim. The lever may be quickly and easily detached from the rim, and, to this end, I provide it with notches in the opposite ends thereof, one notch engaging each of the shackle members. A latch may be provided if desired, which engages a portion of the lever and prevents the rocking movement thereof to collapse the rim, until the latch has been moved out of locking position.

Figure 1:
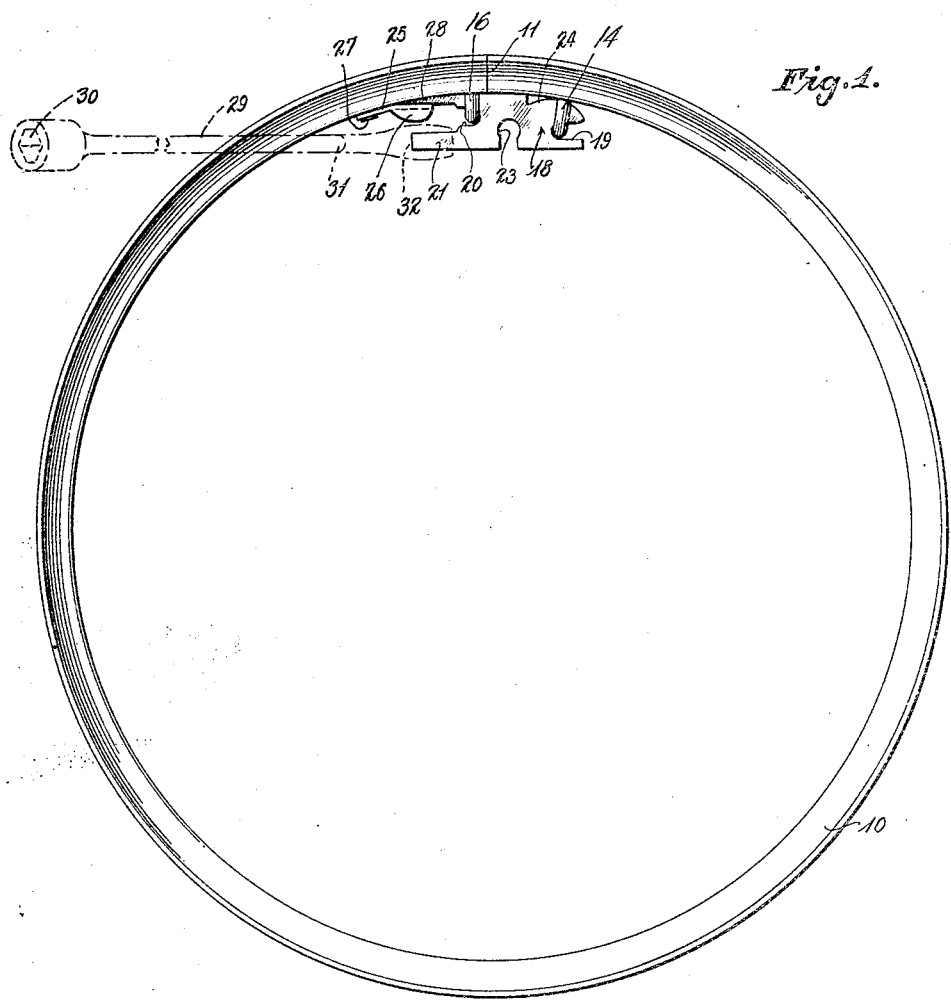
Figure 1 is a view, in side elevation, of a rim embodying my invention, showing in dotted lines the operating tool applied.
Figure 2:
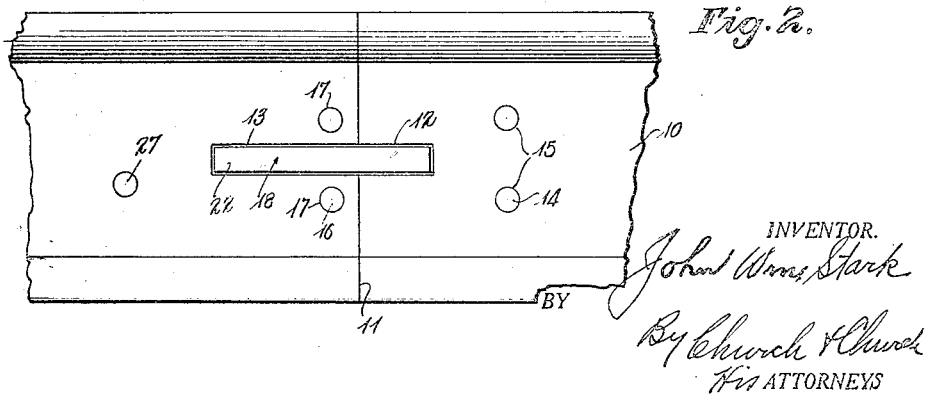
Fig. 2 is a top plan view of that portion of the rim adjacent the split.

Referring to the numbered parts of the drawings, which illustrate the preferred embodiment of my invention, I have shown a demountable rim 10, which is split, at 11. Alined slots 12 and 13 are formed in the central portion of the rim base on opposite sides of the split therein, as shown best in Fig. 2. A shackle member 14 of U-shape is rigidly fastened to one end of the rim, as shown in Fig. 1, and extends inwardly therefrom. This shackle member may be secured to the rim by welding, or it may be riveted thereto, as shown at 15 in Fig. 2. Similarly, a shackle member 16 is secured to the opposite end of the rim, for instance, by riveting, as shown at 17 in Fig. 2. A rim-operating lever 18 is provided, which comprises a flat bar mounted edgewise with respect to the rim base. This lever has a notch 19 formed in one end thereof and a longer notch 20 in the opposite end. The rim-operating lever is mounted in position, as shown in Fig. 1, with the notch 19 receiving the shackle member 14, and the notch 20 receiving the shackle member 16. The portion of the lever, in which is provided the notch 20, has a rearwardly-extending tongue 21, which is adapted to receive the socket 32 of an operating tool 29, which forms, in effect, an extension handle upon the lever to give increased leverage for rocking the same about its pivot. The outer edge portion 22 of the lever is adapted to lie in the alined slots 12 and 13 and, thus, maintains the ends of the rim in lateral alinement with respect to each other. The outer edge portion of the lever immediately above the notch 19 may be curved, at 24, in order to permit this portion of the lever to rock upon the rim base as the lever pivots about the shackle 14. A notch 23 is formed in the inner edge of the lever and is adapted to receive one of the rim-securing bolts extending through the felly of the wheel so as to form a driving connection between the rim and the felly. A latch 25 is provided which is pivoted to the rim base by the rivet 27, and has a lip 26 on one edge by which the latch may be swung about its pivot. The latch is shown in operative position in Figs. 1 and 3, with the tip of the latch underlying the portion 28 of the lever so as to prevent the lever from being rocked about its pivot on the shackle 14. When the rim is to be collapsed, the latch 25 is swung to one side and the lever can then be freely rocked about the pivot 14 through the slot 13 for the purpose of collapsing the rim.

In Fig. 6 I have shown a tool to be used in connection with this rim-operating lever. This tool comprises the body portion 29 which is offset, at 31, and has a socket 32 at one end adapted to fit on the tongue 21 of the lever. A socket 30 may be provided, if desired, on the other end of this tool, to fit the nuts on the rim-securing bolts which are used for fastening the demountable rim on the felly of the wheel.

When the demountable rim is removed from the wheel, and is to be collapsed for the purpose of removing the tire therefrom, the operator applies the socket 32 of the operating tool to the tongue 21 of the operating lever and, after having moved the latch 25 to one side, swings the end 21 of the lever inwardly with respect to the rim. This causes the lever to rock about its pivot on the shackle 14, and the engagement of the notch 20 with the shackle 16 draws the corresponding end of the rim radially inward and then causes it to move circumferentially with respect to the other end of the rim until the parts come to the position shown in Fig. 4. The tire can then be removed from the rim without difficulty. When a new tire has been applied, the parts can be returned to their normal position by simply reversing the movement of the operating lever.

It will be seen that this device is made of but few parts and that it can be manufactured very cheaply and easily. The lever is detachable or separable from the rim and may be quickly inserted in operative position by separating the rim ends circumferentially sufficiently to allow the shackles 14 and 16 to enter the notches 19 and 20, respectively, of the lever. The resilience of the rim then retains the lever in operative position. This lends to the ready manufacture and assembly of the parts and reduces the cost of manufacture.

I am aware that the particular embodiment of my invention illustrated in this application may be varied considerably without departure from the spirit of my invention and, therefore, I claim my invention broadly, as indicated by the appended claims.

What I claim is:

1. The combination of a one-piece transplit demountable rim, a rim-operating lever hinged at one end to an end of the rim, a pintle member secured to the other end of the rim, the other end of said lever being longitudinally notched to constitute a fork in which said pintle member is held by the inherent elasticity of the rim, and means by which said lever may be swung to make or break the rim.

2. The combination of a one-piece transplit demountable rim, a pair of pintle members on said rim at opposite sides of its split, a rim-operating lever terminating in forked portions in which said pintles are received and maintained by the inherent elasticity of the rim and means by which said lever may be swung to make or break the rim.

3. The combination of a one-piece transplit demountable rim, a pair of pintle members on said rim at opposite sides of its split, a rim-operating lever terminating in forked portions in which said pintles are maintained by the inherent elasticity of the rim, a notch extending radially into said lever intermediate said forked portions and by which said rim may be keyed to the felly of a wheel, and means by which said lever may be swung to make or break the rim.

4. The combination of a one-piece transplit demountable rim, a rim-operating lever hinged at one end to an end of the rim, a pintle member secured to the other end of the rim, the other end of said lever being deeply notched longitudinally to constitute a fork in which said pintle member is held by the inherent elasticity of the rim, one of the branches of said fork being of such size and length as to constitute a member by which the lever may be swung to make or break the rim.

5. The combination of a transplit demountable rim, a pair of pintle members fixed to the rim on opposite sides of its split and adjacent thereto, a rim-operating lever fulcrumed on one pintle and having one arm hinged at its extremity to the other pintle, and having its other arm deeply notched, longitudinally, to provide a pair of spaced tongues, one fitting in a slot in the rim base, the other tongue well spaced from the rim base and capable of facile engagement by a tool for rocking the lever, and means engageable in said notch for locking the operating lever in position with said tongue fitted in the slot of the rim base.

6. The combination of a one-piece transplit demountable rim, a rim-operating lever hinged at one end to an end of the rim, a pintle member secured to the other end of the rim, said lever having its other end provided with a deep longitudinal notch in which said pintle member is held by the inherent elasticity of the rim, said notch dividing the free arm of the lever into two tongues, one fitted in a slot in the rim base, the other well spaced from the rim base and capable of facile engagement by a tool for rocking the lever, and means engageable in said notch for locking the first mentioned tongue in the slot of the rim base.

7. The combination of a transplit demountable rim having alined slots formed in the adjacent ends of a rim, a pair of shackle members fixed to the rim adjacent to but on opposite sides of the split and extending inwardly from the rim base, a rim operating lever terminating at each end in a fork in which a shackle member is received and held by the inherent elasticity of the rim, said lever being disposed edgewise to the rim base and having its outermost edge portion positioned in said slots and maintaining alinement of the ends of the rim.

JOHN WILLIAM STARK.